(12) United States Patent
Chang et al.

(10) Patent No.: US 9,210,540 B2
(45) Date of Patent: Dec. 8, 2015

(54) METHOD AND APPARATUS FOR GEOGRAPHIC DOCUMENT RETRIEVAL

(71) Applicant: xAd, Inc., New York, NY (US)

(72) Inventors: Chi-Chao Chang, Palo Alto, CA (US); Mauricio Mediano, Campbell, CA (US); Srihari Venkatesan, Cupertino, CA (US); Prakash Muttineni, San Ramon, CA (US); Dipanshu Sharma, New York, NY (US)

(73) Assignee: xAd, Inc., New York, NY (US)

( * ) Notice: Subject to any disclaimer, the term of this patent is extended or adjusted under 35 U.S.C. 154(b) by 243 days.

(21) Appl. No.: 13/867,029

(22) Filed: Apr. 19, 2013

(65) Prior Publication Data

US 2014/0129566 A1 May 8, 2014

Related U.S. Application Data

(60) Provisional application No. 61/724,295, filed on Nov. 8, 2012, provisional application No. 61/724,298, filed on Nov. 8, 2012, provisional application No. 61/724,299, filed on Nov. 8, 2012.

(51) Int. Cl.
*G06F 17/30* (2006.01)
*H04W 4/02* (2009.01)
*G06Q 30/02* (2012.01)
*H04L 29/08* (2006.01)

(52) U.S. Cl.
CPC ......... *H04W 4/02* (2013.01); *G06F 17/30011* (2013.01); *G06F 17/30241* (2013.01); *G06F 17/30321* (2013.01); *G06Q 30/0205* (2013.01); *G06Q 30/0261* (2013.01); *H04L 67/20* (2013.01); *H04W 4/021* (2013.01); *H04W 4/028* (2013.01)

(58) Field of Classification Search
CPC ................................................ G06F 17/30011
See application file for complete search history.

(56) References Cited

U.S. PATENT DOCUMENTS

| | | | |
|---|---|---|---|
| 2009/0005987 A1 | 1/2009 | Vengroff et al. | |
| 2014/0057650 A1 | 2/2014 | Versteeg et al. | |
| 2014/0067938 A1 | 3/2014 | Boldyrev et al. | |
| 2014/0344718 A1 | 11/2014 | Paraport et al. | |

OTHER PUBLICATIONS

Zhou. Hybrid Index Structures for Location-based Web Search. 2005. http://delivery.acm.org/10.1145/1100000/1099584/p155-zhou.pdf?ip=151.207.250.71&id=1099584&acc=ACTIVE%20SERVICE&key=C15944E53D0ACA63%2E4D4702B0C3E38B35%2E4D4702B0C3E38B35%2E4D4702B0C3E38B35&CFID=481269756&CFTOKEN=78369420&__acm__=1424702083_2be6d2c783b6de9967aae80da8fac423.*
Lucene. https://web.archive.org/web/20110802041330/http://wiki.apache.org/lucene-java/LuceneFAQ. 2011.*

(Continued)

*Primary Examiner* — Syed Hasan
(74) *Attorney, Agent, or Firm* — Jamie J. Zheng, Esq.

(57) ABSTRACT

A geographic document retrieval method (GDR) can be executed by a computer system to index, retrieve and rank geographical documents. Textual and spatial attributes of geographical documents are indexed separately using inverted index and spatial index, respectively. Spatial attributes of a document are represented as one or more contiguously closed regions of arbitrary shapes. Upon receiving an input query carrying a geographic representation of a location using arbitrary regions, the GDR method retrieves one or more documents by executing an overlap test between arbitrary regions from the query and the arbitrary regions associated with the documents.

20 Claims, 13 Drawing Sheets

(56) References Cited

OTHER PUBLICATIONS

Response to Non-Final Office Action, U.S. Appl. No. 13/867,021, filed Apr. 19, 2013, entitled "Method and Apparatus for Probabilistic User Location," filed Mar. 12, 2015.

Non-Final Office Action, U.S. Appl. No. 13/867,021, filed Apr. 19, 2013, entitled "Method and Apparatus for Probabilistic User Location," issued Dec. 12, 2014.

* cited by examiner

METHOD AND APPARATUS FOR GEOGRAPHIC DOCUMENT RETRIEVAL

CROSS REFERENCE TO RELATED APPLICATIONS

The present application claims the benefit of priority from U.S. Provisional Application No. 61/724,295 entitled "Method and Apparatus for Probabilistic User Location," filed on Nov. 8, 2012, U.S. Provisional Application No. 61/724,298 entitled "Method and Apparatus for Dynamic Fencing," filed on Nov. 8, 2012, and U.S. Provisional Application No. 61/724,299 entitled "Method and Apparatus for Geographic Document Retrieval," filed on Nov. 8, 2012, each of which is incorporated herein by reference in its entirety. The present application is related to commonly assigned U.S. Patent Application entitled "Method and Apparatus for Probabilistic User Location," filed on even date herewith, and to U.S. Patent application entitled "Method and Apparatus for Dynamic Fencing," filed on even date herewith, each of which is incorporated herein by reference in its entirety.

FIELD

The present disclosure is related to location-based mobile applications, and more particularly to geographical document retrieval in location-based mobile applications.

DESCRIPTION OF THE RELATED ART

Hyperlocal advertising is the ability to deliver precise, relevant, and timely advertising to consumers based on estimate of their location at the moment of delivery. Nowadays, with the advent of smartphones and tablets, hyperlocal advertising is becoming increasingly popular among online marketers as a vehicle of choice to deliver their messages to targeted mobile audiences on mobile devices. Various industry experts predict over 1.5 trillion mobile consumer page views a month, translating to hundreds of billions of ad impression opportunities a month, or billions a day. There are currently an estimated 20 million stores and small businesses located in the US alone.

Geo-Fencing or location-based targeting involves sending information or push notifications to consumers who enter virtual perimeters set around physical places. Such technologies allow an advertiser to create a virtual "fence" around a point or place of interests. For example, an advertiser can pinpoint a store, and deliver a specific advertisement ("ad") to anyone who comes within a pre-defined geographic area around that store. Ads delivered through geo-fencing typically yield higher hit rate and better return of investment for advertisers since they're more contextual.

SUMMARY

A geographic document retrieval method (GDR) can be executed by a computer system to index, retrieve and rank geographic documents. In one embodiment, a method of indexing geographical documents comprises separating textual attributes and spatial attributes associated with each of the geographical documents; indexing the textual attributes using inverted index; and indexing the spatial attributes using spatial index. In certain embodiments, the spatial attributes include one or more contiguously closed regions of arbitrary shapes, and the method further compeises: for each respective contiguously closed region, computing a smallest rectangle that contains the respective contiguously closed region. In certain embodiments, the spatial index includes a bounding-Box field corresponding to the smallest rectangles and a shape field corresponding to geometry of the contiguously closed regions, each of which can be stored in a respective V-tree.

In certain embodiments, a method of retrieving geographical documents comprises: receiving a query having a set of spatial clauses and at least one other clause, the set of spatial clauses representing one or more contiguously closed geographical regions of arbitrary shapes; retrieving at least one first document whose spatial index matches the set of spatial clauses; selecting at least one second document from the at least one first document, the at least one second document having inverted index that matches the at least one other clause in the query; and ranking the at least one second document.

In certain embodiments, the at least one first documents are selected by: computing a bounding box for each of the one or more contiguously closed geographical regions; and searching for geographical documents whose bounding boxes intersect the bounding box for each of the one or more contiguously closed geographical regions, the geographical documents being stored in a computer readable medium. It is then determined whether any of the geographical documents whose bounding boxes intersect the bounding box for each of the one or more contiguously closed geographical regions has one or more contiguously closed geographical regions overlap any of the one or more contiguously closed regions represented by the query. The geographical documents having one or more contiguously closed geographical regions that overlap with any of the one or more contiguously closed regions represented by the query are returned as the one or more first documents.

In certain embodiment, each of the at least one second document is ranked based on a set of features of the associated regions that overlaps with the regions from the query (referred hereafter as the "overlapped regions").

Thus, in certain embodiments, geographic information of a document is represented as arbitrary regions. Upon receiving an input query carrying a geographic representation of a location using arbitrary regions instead of traditional input types such as integers or strings, the GDR method retrieves one or more documents by executing an overlap test between arbitrary regions from the query and the arbitrary regions associated with the documents. Examples of arbitrary regions represented in the query can be probable mobile user locations or locations of interests in the context of mobile advertising applications, and examples of the geographical documents can be text, graphic, audio and/or video advertisements.

Although the present disclosure uses hyper-local ad serving as exemplary applications of GDR, GDR can be applied to other areas such as location-based searches, location-based directory searching or browsing, to name a few. In one embodiment, GDR responds to queries with regions of interest and retrieves objects associated with a geographical region that intersects with at least one of the regions of the query. Possible applications include, but are not limited to:

- Ad networks—where the objects retrieved are ads of businesses that have a physical presence;
- Social networks—where objects can be location of friends or places recommended by friends;
- Surveillance, tracking—where the objects can be people or locations that have special significance to the tracking or surveillance activity;

Search—nearby relevant locations;

Travel and local—Nearby places to visit or explore; and

Other Geographical Information System (GIS) types of applications where you have geographical objects that are potential candidates to GDR.

In one embodiment, GDR comprises storeing and indexing geographic documents with associated arbitrary geographical regions; combining inverted indexes with spatial indexes in order to execute queries that combine spatial operators applied to arbitrary shapes; applying an OVERLAP operator to retrieve geographic documents having associated arbitrary geographical regions overlapping geographical regions specified in queries; and/or ranking documents based on a set of features of overlapped regions with arbitrary shapes.

In one embodiment, GDR indexes documents with their associated locations (e.g., business locations, additional target locations, and/or points of interest), makes use of geo-spatial data of local businesses, location profiling, consumer behavior data, and leverages probable user locations. The local businesses are businesses whose advertisements are being served. Location profiling can be, for example, business categories and demographics predominant in a region or area. Consumer behavior data can include, for example, mobile search queries, mobile application and browser page views, user clicks on ads, secondary actions on ads and landing pages (where a click would take the user to). Probable user locations can be represented by one or more arbitrary regions in a map which are associated with probability densities.

Thus, fine-grained document selection based on probable locations of a mobile user is made possible by GDR, which is also designed for high performance (i.e. low round-trip latencies as measured in miliseconds, high bandwidth or throughput as measured by queries per second, etc.), high scalability (i.e. ability to scale the deployment automatically and seamlessly as traffic levels and dollars spent increase), and high effectiveness as measured by click-through rates and secondary action rates.

DESCRIPTION OF EMBODIMENTS

Figure 1A:
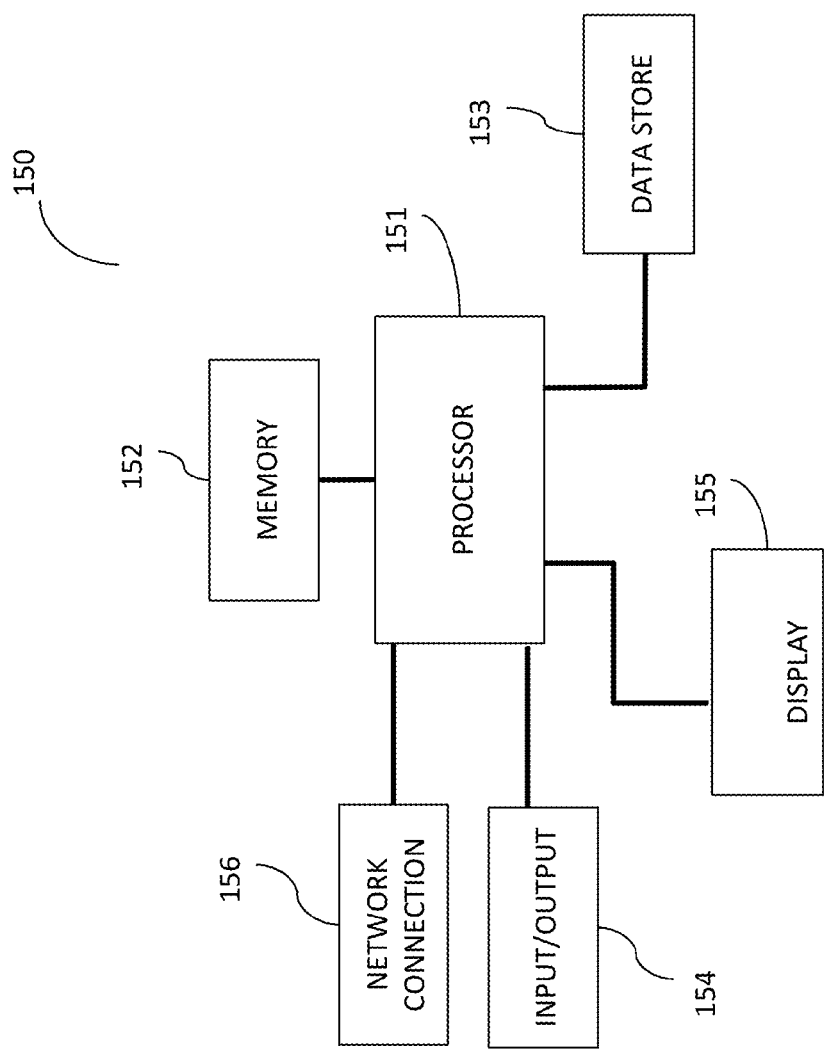
FIG. 1A is a block diagram of a computer system that can be used to carry out a method for geographical document retrieval (GDR) according to certain embodiments.

A computer system (e.g., a server computer) executing a software program can be used to carry out a GDR method according to certain embodiments. FIG. 1A is a block diagram of an example of such a computer system 150, which includes a processor 151, a memory 152, one or more data stores 153, input/output devices 154 such as keyboard/mouse/touchscreen, one or more display devices 155, such as a monitor, a wired and/or wireless connections 156 to a network, such as a local area network and/or a wide area network (e.g., the Internet). The software programs can be stored in a computer readable medium (such as a data store 153 and or other portable computer readable medium that is not shown). When loaded in the memory 152 and executed by the processor 151, the software programs cause the processor to carry out GDR method described herein. In one embodiment, location-based documents/information and historical, aggregate data collected from many requests from mobile devices are also store in the data store 153. The one or more data stores 153 can be computer readable media local to the processor 151 and/or coupled to the processor via a local or wide-area network.

Figure 1B:
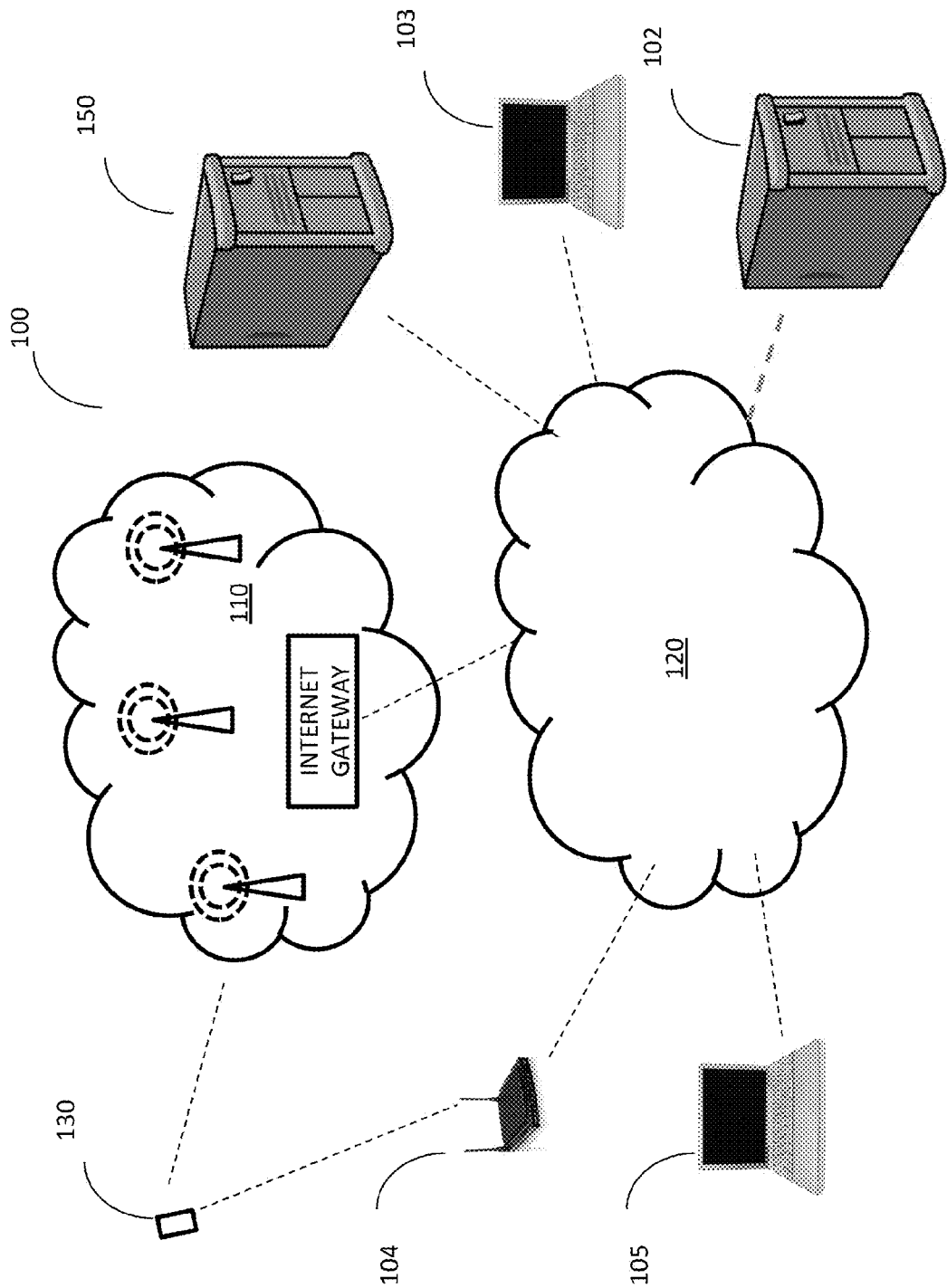
FIG. 1B is a diagram illustrating a packet-based network including part or all of a cellular network, the Internet, and computers and servers coupled to the Internet according to certain embodiments.

FIG. 1B illustrates a packet-based network 100 (referred sometimes herein as "the cloud"), which, in some embodiments, includes part or all of a cellular network 110, the Internet 120, and computers and servers coupled to the Internet. The computers and servers can be coupled to the Internet 120 using wired Ethernet and optionally Power over Ethernet (PoE), WiFi, and/or cellular connections. As shown in FIG. 1B, a mobile device 130 such as a smart phone is also coupled to the packet-based network via WiFi or cellular connections. When a WiFi hotspot (such as hotspot 104) is available, the mobile device 130 may connect to the Internet via the WiFi hotspot using its built-in WiFi connection. Mobile device 130 may also communicate with the cellular network using its built-in cellular connection to connect to the cellular network 110, which is coupled to the Internet via an Internet Gateway. Thus, the mobile device may interact with other computers/servers coupled to the Internet.

As shown in FIG. 1B, the computers/servers coupled to the Internet 120 may include one or more computers/servers 150 that is used to execute the software programs to carry out GDR according to certain embodiments. They may also include one or more computers/servers 102 associated with a mobile publisher, one or more computers/servers 103 associated with an on-line marketer, and other computers/servers 105.

A traditional document request arriving at a server, e.g., an ad request in online advertising, includes two typical location inputs for querying an index of geographic documents—an user location of interest and a maximum distance threshold. The user location is typically a piece of location information (a lat-long coordinate, zip code, city/state or IP address) that represents the location where the user is at the moment of the request or where the user is interested in; the maximum distance threshold is the maximum distance, as measured from the user location, of the documents that the user may be interested in looking at.

In all known systems in the industry today, this distance parameter is a configurable constant (e.g. 5 miles or 10 miles), which once configured is applicable to all ad requests. It is possible to build a real-time, online module that once queried would return a dynamic value for this parameter (e.g. for some queries it would return 2 miles while for others it would return 3 miles). Either solution associates a distance parameter for each ad request, irrespective of the local advertisements eligible for the request. This is static fencing. Using a simple analogy, static fencing treats location-based ad selection as having a fisherman (the user) cast a net of 10 meters of diameter in the water—fishes within 10 meters can be caught while those beyond 10 meters can continue to swim free.

Dynamic fencing turns this picture around. Instead of specifying a distance input per request, dynamic fencing associates geographic regions of arbitrary shapes and sizes with a document (or advertisement), eliminating any need for a real-time, online look-up of the distance parameter (per request) and allowing fine-grain matching and selection of documents or ads. Using the same analogy as above, each local advertisement is now a fisherman who casts one or more nets of arbitrary shapes or sizes. The fish is caught as it swims into any of the one or more nets.

Dynamic fencing is further described in the co-pending, commonly owned U.S. Patent Application entitled "Method and Apparatus for Dynamic Fencing," filed on even date herewith.

The user location input represents an estimated location of the user or a location the user is interested in. Data types that represent such location are latitude and longitude (a coordinate with two real numbers, referred hereafter as "LL" in short), or an IP address (4 octets, referred hereafter as "IP" in short), or a zip code (an integer or string, referred hereafter as "ZC" in short), or a city/state (a text string, referred hereafter as "CS" in short). While they continue to be widely used in the industry, these data types are inadequate for the needs of modern fine-grain geographic document retrieval, in particular, hyper-local ad retrieval, because of the following reasons:

ZC or CS representations are usually inadequate. ZC and CS boundaries span tens and sometimes hundreds of square miles; converting them to LLs using publically available geo-coding techniques would simply get the centroid of the ZC or CS.

LL representation is typically inaccurate. Geo-coded LLs originating from IPs, ZCs, and CSs lose precious geographic information (i.e. reducing a region to a point). In addition, in the presence of user mobility, often times the requested LL is not longer the actual user location by the time the document is fully consumed by the user Integer and string types lend themselves to exact matching (i.e. string matching) between the input and the indexed documents. This has a negative impact on overall document recall. For example, documents or ads associated with Mountain View, Calif. or Sunnyvale, Calif., could be relevant for Palo Alto, Calif., but simple string matching would have excluded these documents from consideration.

Probabilistic user location overcomes these limitations by representing user location input as a collection of arbitrary regions. It breaks down the artificial boundaries introduced by ZC and CS. Probabilistic user location is further described in the co-pending, commonly owned U.S. Patent Application entitled "Method and Apparatus for Probabilistic User Location," filed on even date herewith.

Figure 1C:
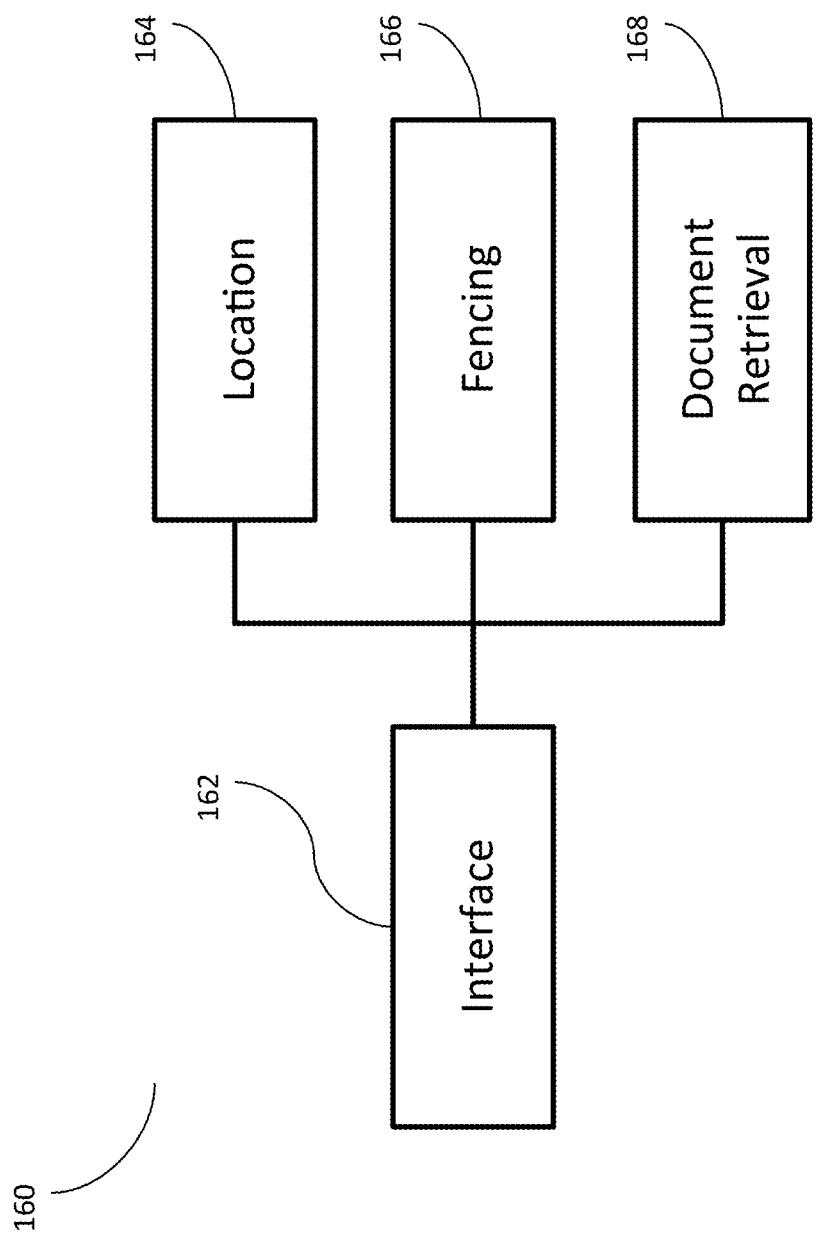
FIG. 1C is a block diagram of software engines or application programming interfaces (API) in one or more servers executing a software programs to carry out a method for GDR according to certain embodiments.

As shown in FIG. 1C, in one embodiment, the one or more servers 150 executing the software programs to carry out GDR may provide one or more software engines or application programming interfaces (API) 160, including, for example, an interface engine 162 and a GDR engine 168. In a further embodiment, the one or more servers 150 executing the software programs may also include a location engine 164 to generate probabilistic user locations (regions of arbitrary shapes where a mobile user if likely to be in) and/or a fencing engine 166 for generating dynamic fences (i.e., regions of arbitrary shapes) to be associated with geographic documents.

In one embodiment, a region with arbitrary shape R is a set of one or more contiguous closed regions $R=\{r_1, r_2, \ldots, r_n\}$ where each contiguous region $r_i$ has an external boundary $e_i$ and possibly a set of one or more internal boundaries $i_i=\{k_{i1}, k_{i2}, \ldots, k_{im}\}$, also called holes. Each boundary b, external or internal, is defined by a sequence of points $b=seq\{p_1, p_2, \ldots, p_n\}$. A point p has two coordinates, latitude and longitude. The external boundaries of two contiguous closed regions that belong to the same arbitrary region can only touch on a single point. Likewise, an internal boundary of a contiguous closed region can only touch another internal boundary on a single point. Finally, an internal boundary of a contiguous closed region can only touch the external boundary of the region on a single point.

Figure 2:
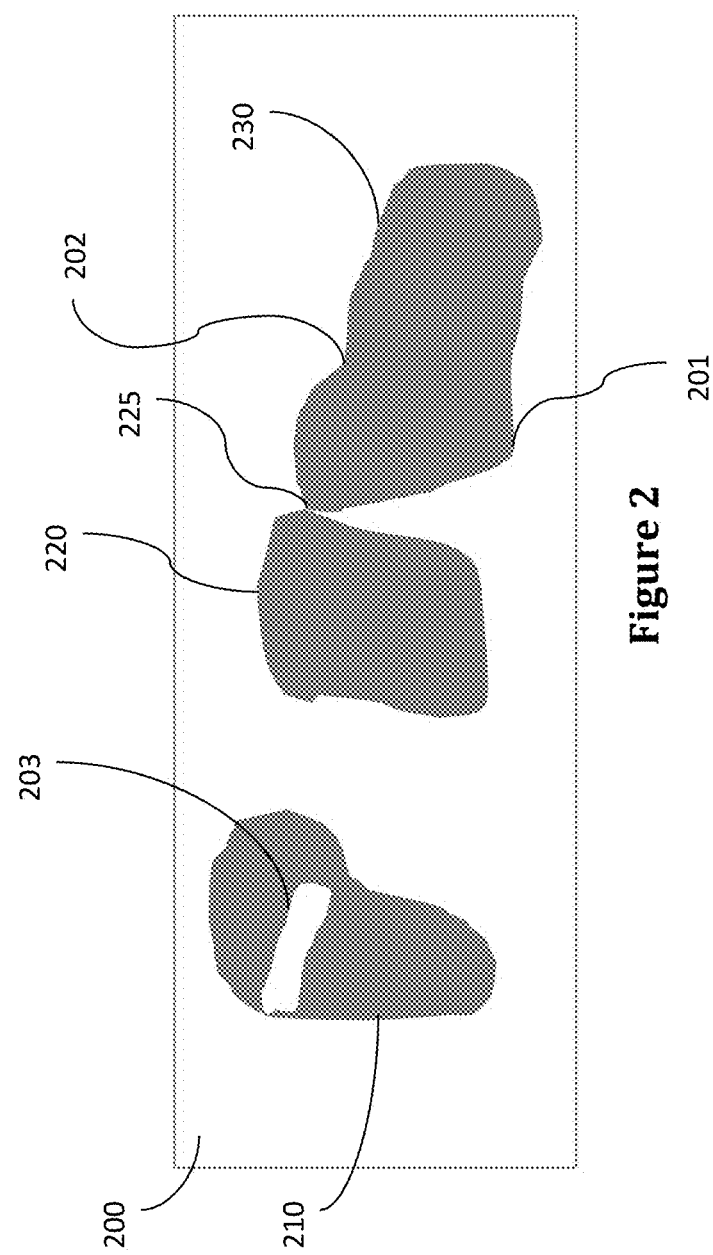
FIG. 2 is a diagram illustrating one example of a region with arbitrary shape composed of one or more contiguous closed regions

FIG. 2 shows one example of a region 200 with arbitrary shape composed of three contiguous closed regions 210, 220, and 230. Region 210 has one internal boundary 203. The remaining two contiguous closed regions 220 and 230 touch at a single point 225. As shown in FIG. 2, these regions 210, 220 and 230 have arbitrary shapes and can include both convex corners/curves 201 and non-convex corners/curves 202, and can have holes 203.

In certain embodiments, regions with arbitrary shapes are used to describe a location associated with an indexed document (i.e. the location targets for an advertisement) as well as the input location of the query (i.e. the probable location of the user to whom the advertisement is directed).

In certain embodiments, inverted indexes are data structures used to retrieve documents based on its content. An inverted index can have any of four main internal data structures:

PostingList(A) is a list of all occurrences of a term A in an corpus of documents. Each occurrence of a term in a posting list has a docID (identifier of the document where the term A occurs) and may optionally have a payload. Two common types of payloads are:

A list of positions where the term appears in the document;

A weight that reflects the importance of the term in the document.

Dictionary is a hash table that maps a set of terms to their respective posting lists.

Forward index contains attributes of the document that are needed after the document is retrieved. In advertising, the post-processing stages are: ranking, exclusion filters, auction and display to the user. Examples of attributes stored in the forward index for mobile advertisements are: title, description, location of the business, promotions etc.

Lookup tables store auxiliary data in a (key, value) pair format. One example of look-up table commonly used in advertising is information about the budget of an advertising account associated with the ad indexed.

In certain embodiments, a spatial index is used to retrieve documents based on its content. The main difference is that the content indexed has two or more dimensions. In one embodiment, in the context of advertising, the geographical area targeted by advertising campaigns is a region with arbitrary shape defined previously in this document. The query that represents the location of the user is also a region with arbitrary shape computed by the location engine, where each contiguous region represents one possible location of the user. In such context, the spatial index retrieves ads whose targeting campaigns intersect the location of the user.

There are two main type of methods for indexing using spatial data: point access methods, or PAMs, are used to index points, and spatial access methods, or SAMs, can index points and regions. In one embodiment, the R-tree as SAM is used for geographical document retrieval. However, any other SAM can be seamlessly used with the claims in this document.

In certain embodiments, an adequate information retrieval query language for mobile advertising systems can be a flat conjunction with:
- Conventional clauses, including but not limited to: boolean expressions (e.g., NOT and OR), comparisons (e.g., IN), etc.
- A spatial operator: OVERLAP Below are a few examples from mobile advertising of ad requests and their respective queries:
Ad request 1:
  Ad request comes from a 43 years old male using an iPhone at 4 PM on Friday with a latitude-longitude coordinate of (50,50). A recommendation system suggests "New Car" and "Irish Pub" keywords for this user.
  Query: (43 IN ad.targetAge) AND ("iPhone" IN ad.targetDevices) AND ("male" IN ad.targetGender) AND ("4 PM" IN ad.targetDayParting) AND ("Friday" IN ad.targetDayOfWeek) AND ("New Car"==ad.targetKeyword OR "Irish Pub"==ad.targetKeyword) AND (getGeometricRepresentation(50,50) OVERLAP ad.targetRegion)
Ad request 2:
  Ad request comes from an Android device in San Francisco from a 28 years old user at 1 AM on Saturday. A recommendation system suggests "Fancy Restaurant" and "Nightclub" for this user.
  Query: (28 IN ad.targetAge) AND ("Android" IN ad.targetDevices) AND ("1 AM" IN ad.targetDayParting) AND ("Saturday" IN ad.targetDayOfWeek) AND ("Fancy Restaurant"==ad.targetKeyword OR "Nightclub"==ad.targetKeyword) AND (getGeometricRepresentation("San Francisco") OVERLAP ad.targetRegion)
Ad request 3:
  Ad request comes from a 35 years old female using a Windows phone while driving on Highway 101 near San Mateo at 10 AM on Friday, Thanksgiving Day. A recommendation system suggests "Whole Foods" and "Gas Station" for this user.
  Query: (35 IN ad.targetAge) AND ("Windows Phone" IN ad.targetDevices) AND ("female" IN ad.targetGender) AND ("10 AM" IN ad.targetDayParting) AND ("Friday" IN ad.targetDayOfWeek) AND ("Thanksgiving Day" IN ad.targetHoliday) AND ("Whole Foods"==ad.targetKeyword OR "Gas Station"==ad.targetKeyword) AND (getGeometricRepresentation("Highway 101 near San Mateo") OVERLAP ad.targetRegion)

The operator getGeometricRepresentation of a location implements the method of probabilistic user location described above and in the co-pending, commonly owned U.S. patent application entitled "Method and Apparatus for Probabilistic User Location," filed on even date herewith.

Figure 3A:
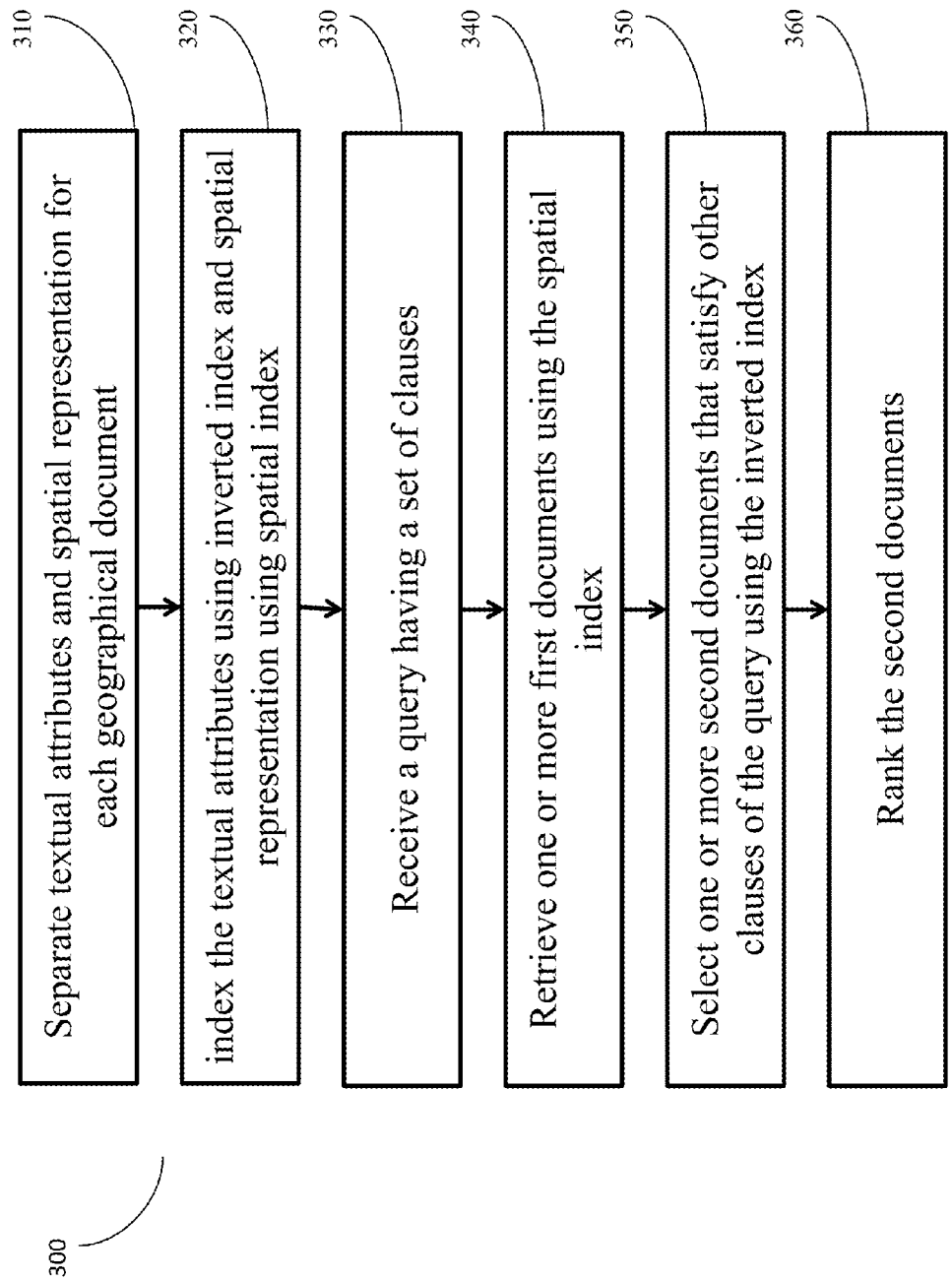
FIG. 3A is a flowchart illustrating a GDR method according to certain embodiments.

FIG. 3A is a flowchart illustrating a GDR method 300 carried out by the one or more servers executing the software programs according to certain embodiments. As shown in FIG. 3A, the GDR method 300 separates (310) textual attributes and spatial representation associated with each document and indexes (320) them separately. In one embodiment, the textual attributes are indexed using inverted index while the spatial representation is indexed using spatial index. When a query is received (330), which contains a set of clauses, including spatial clauses representing one or more regions of arbitrary shape and size, the GDR method 170 uses a query processor to retrieve (340) one or more first documents whose spatial index matches the spatial clauses. The query processor then selects (350) from the first documents one or more second documents whose inverted indexes satisfy the other clauses. The one or more second documents are returned (360) as the document(s) retrieved by the GRD method in response to the query.

Figure 3B:
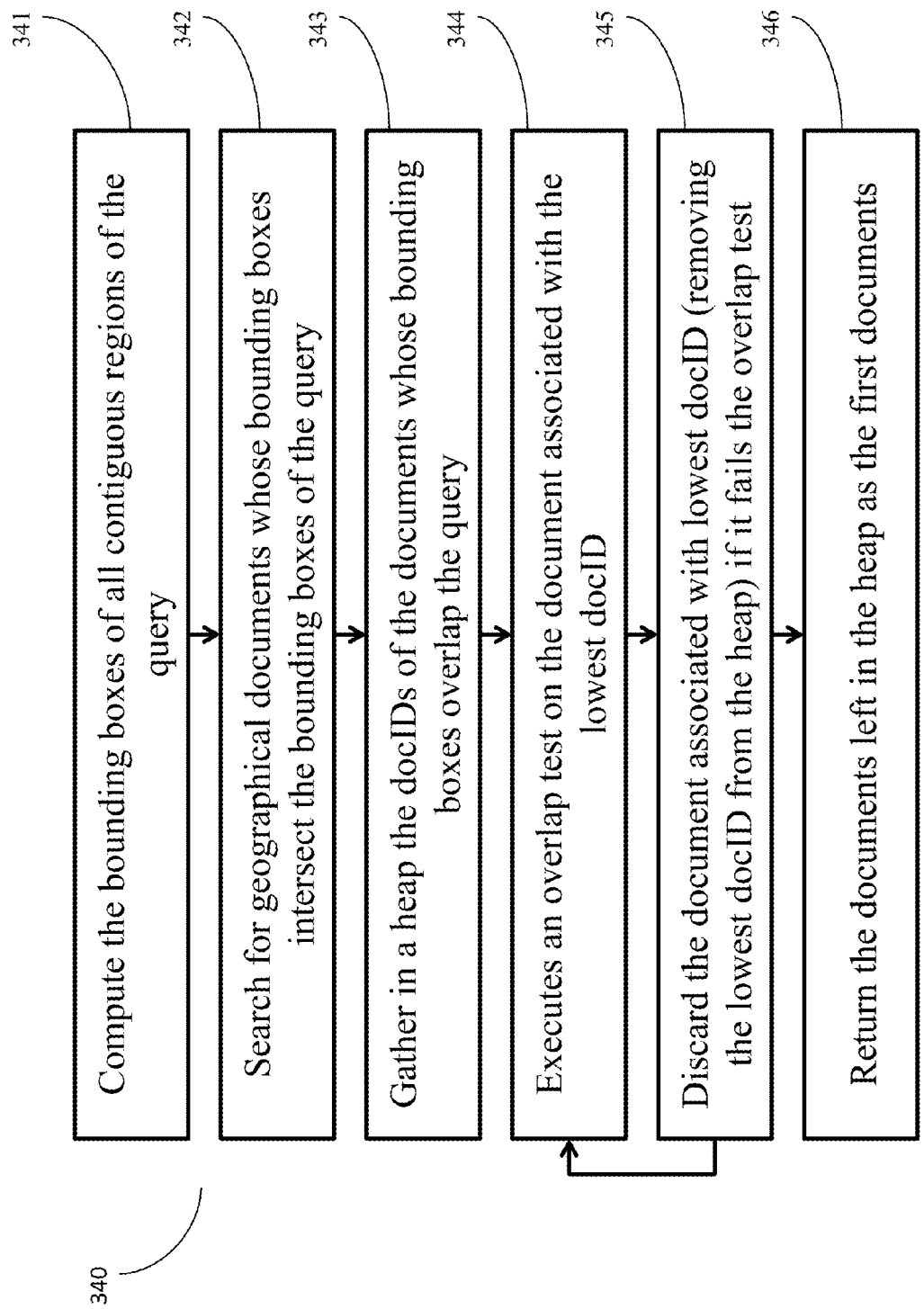
FIG. 3B is a flowchart illustrating a method to retrieve one or more first documents based on spatial index in the GDR method according to certain embodiments.
Figure 4:
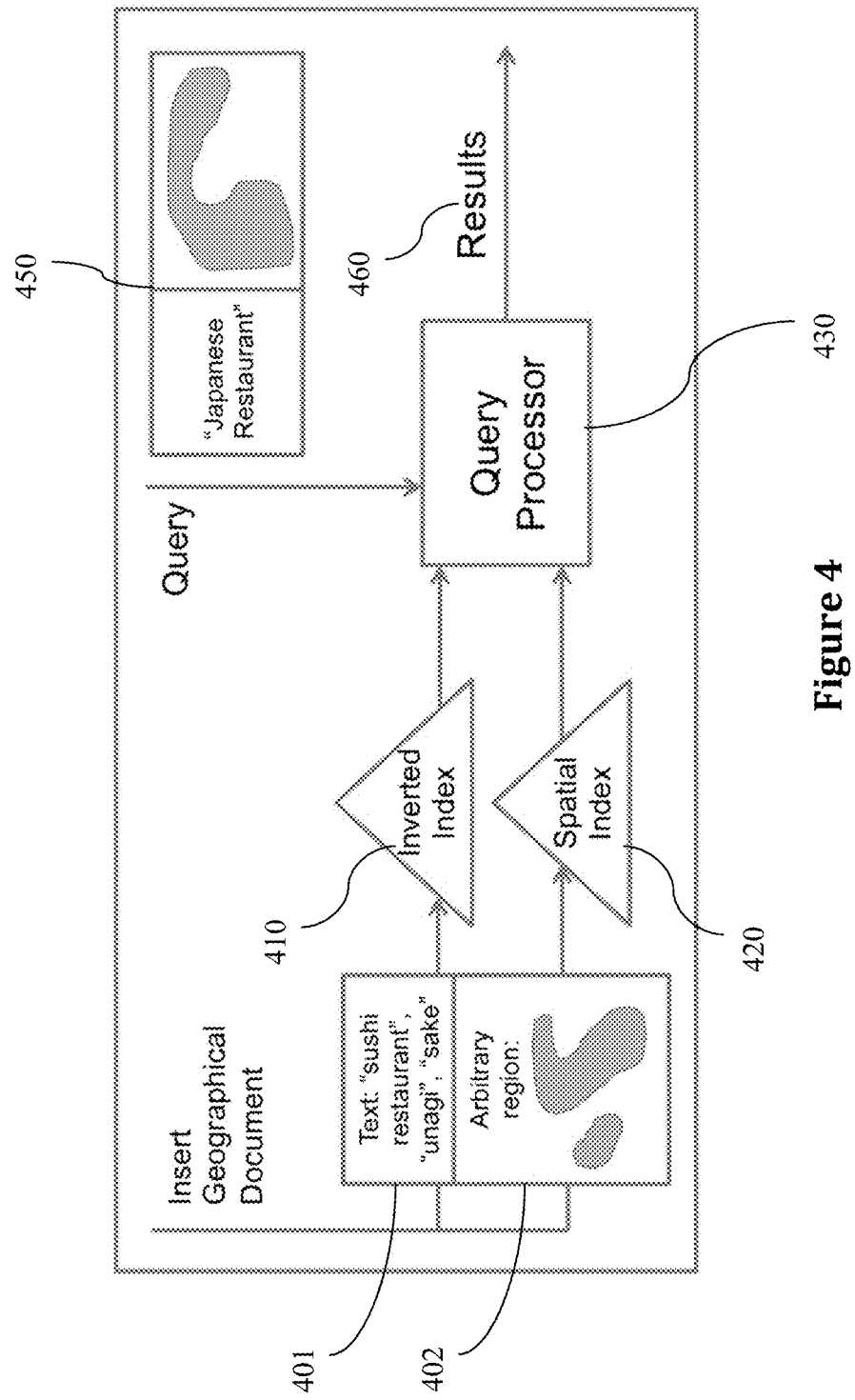
FIG. 4 is a high-level diagram illustrating an example of how textual attributes and spatial attributes associated with a geographical document are indexed separately using inverted index and spatial index, respectively, according to certain embodiments.

FIG. 3B is a flowchart illustrating a method 340 used by the query processor to retrieve the one or more first documents based on the spatial index in the GDR method 300 according to certain embodiments. As shown in FIG. 3B, the method 340 computes (341) a bounding box for each of the one or more regions represented in the query, and searches (342) for geographical documents whose bounding boxes intersect the bounding boxes of the query. The ID's for the found documents (docID) are gathered (343) in a heap, and an OVERLAP operator is executed (344) on the document with the lowest docID to determine if the geographical regions associated with the document overlaps with the regions represented in the query. If no overlap is found, the document is discarded (345) (its docID removed from the heap) and the process repeats for the document associated with the next lowest docID. After the overlap test is executed on each of the found documents, the documents whose docIDs are left in the heap are returned (346) as the first documents FIG. 4 is a high-level diagram illustrating an example of how the textual attributes 401 and spatial attributes 402 associated with a geographical document are indexed separately using inverted index 410 and spatial index 420, respectively. When the query processor 430 receives a query 450, it retrieves the documents that satisfy the operator OVERLAP using the spatial index 420. The query processor 430 retrieves the documents that satisfy the remaining clauses of the query conjunction using the inverted index 410. The documents returned by both indices become part of the final result 460.

In one embodiment, a conventional method of storing textual attributes in inverted indexes can be used. Further details about how documents are indexed and retrieved are discussed below with respect to certain embodiments.

Figure 5A:
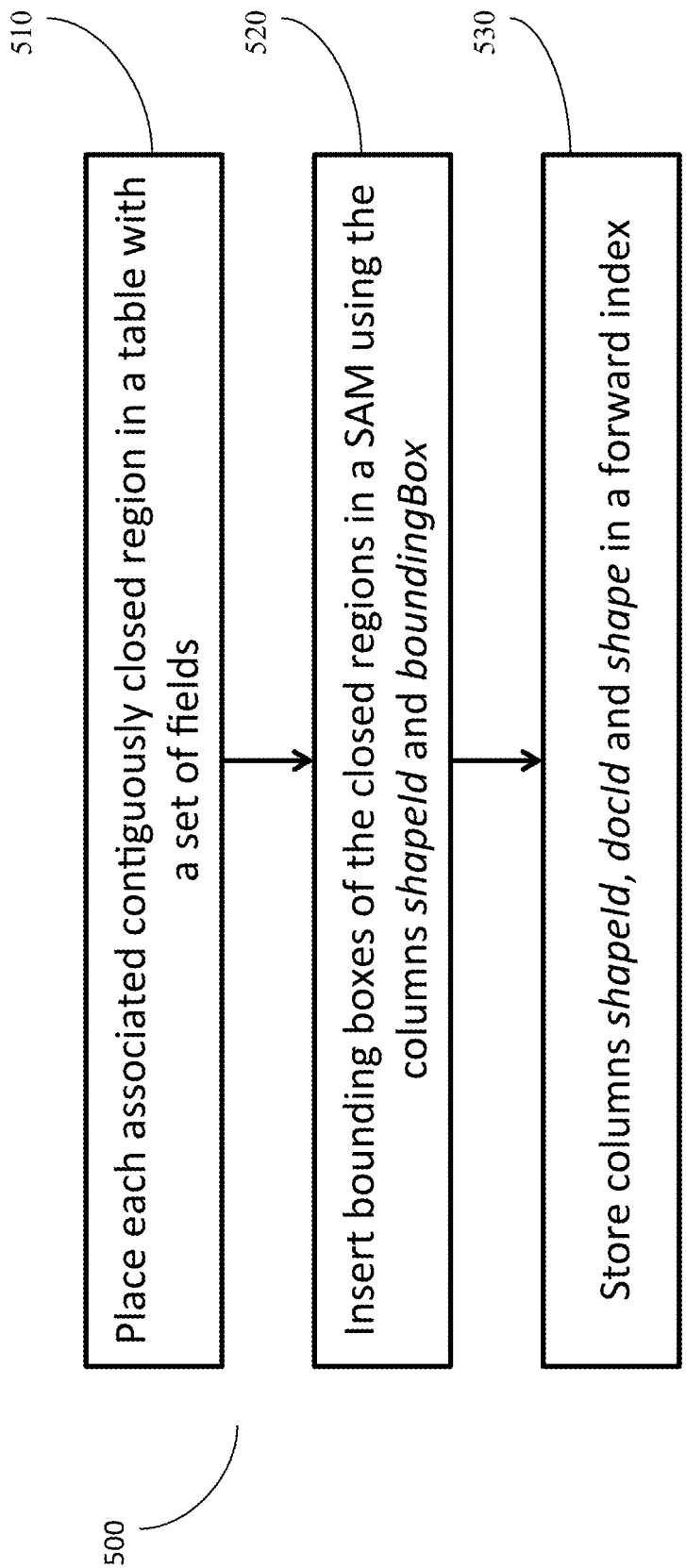
FIG. 5A is a flowchart illustrating a method of indexing documents associated with geographical regions of arbitrary shapes according to certain embodiments.
Figure 5B:
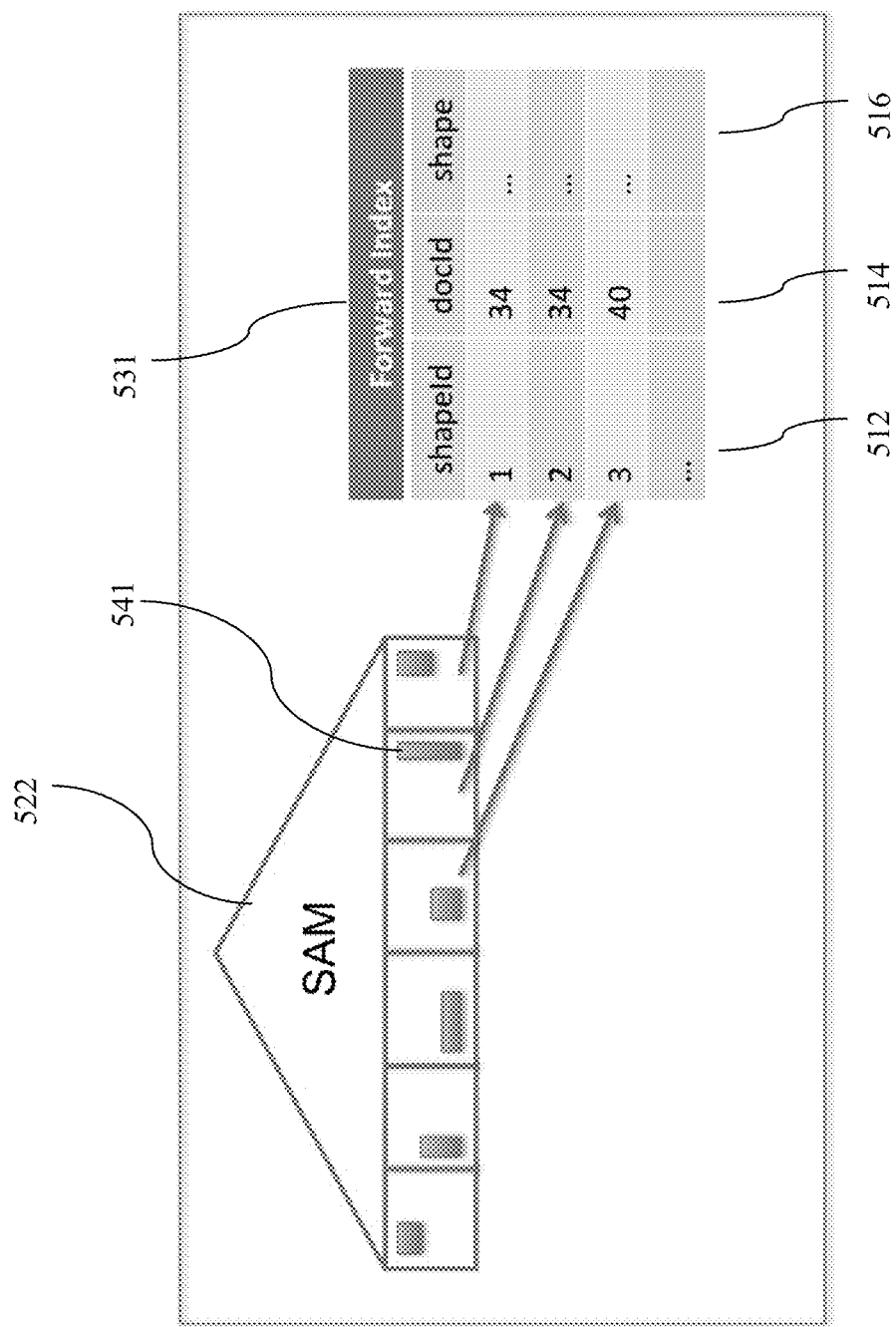
FIG. 5B is a diagram illustrating a spatial access method (SAM) and a forward index used in the method of indexing documents associated with geographical regions according to certain embodiments.

FIGS. 5A and 5B shows how a spatial access method (SAM) is combined with a forward indexing method to index documents associated with geographical regions of arbitrary shapes according to certain embodiments. In one embodiment, as shown in FIG. 5A, a method 500 of indexing documents associated with geographical regions of arbitrary shapes comprises, for each geographical document, placing 510 each associated contiguously closed region in a table with a set of fields such as the following:

- shapeID 512: Each contiguous closed region of a geographic document has its own shapeId. The shapeId is unique across the entire corpus of geographical documents. Note that a geographic document may have more than one contiguous closed region.
- docID 514: The docId is the id of the geographical document. The docID is unique across the entire corpus of geographical documents.
- boundingBox 541: A boundingBox is the smallest rectangle that contains the contiguous closed region. The bounding box has sides parallel to pre-set axes.
- Shape 516: Geometry of contiguous closed region stored in a V-tree. V-trees are optimized for geometrical operations. Other similar data structures could also be used for this purpose.

The method 500 further comprises using the columns shapeId 512 and boundingBox to insert 520 the bounding boxes 541 of the closed regions in a SAM 522, and storing 530 the columns shapeId, docId and shape in a forward index 531, as shown in FIG. 5B.

In certain embodiment, a method of executing a query for geographical documents comprises an application program interface (API) for executing a spatial cursor, which encapsulates the access to the spatial index. A cursor API of certain embodiments comprises:

Iterator Cursor::init(set<ContiguousRegion>spatialQuery)
 This method creates an iterator to iterate over all the geographical documents that overlap the spatial query.
Boolean Iterator::next( )
 This method returns true if the cursor finds a geographical document that overlaps the spatial query, false otherwise.
Boolean Iterator::next(docId)
 This method returns true if the cursor finds a geographical document that overlaps the spatial query and the id of the document is greater or equal to docId, false otherwise.
Dodd Iterator::getDocId( )
 This routine should only be called after one of the next methods above returns true, and which returns the ID of the geographic document. The document IDs should be returned in ascending order.
set<RegionId contiguousRegionId, double contiguousRegionOverlap>::Iterator::getOverlapStats( )
 This routine should only be called after one of the next methods above returns true. It returns the fraction of the area of each contiguous region of the query that overlaps with the geographical document.

When the query processor receives a query, it initializes a spatial cursor iterator. The iterator computes the bounding boxes of all contiguous regions of the query. Next, the spatial cursor searches the SAM for all the geographical documents whose bounding boxes intersect the bounding boxes of the query. Next, it inserts in a heap the IDs of the documents whose bounding boxes overlap the query. Note that the overlap test above is applied to the bounding boxes, which are approximations of the actual geometry of the contiguous regions of both query and geographical documents. The overlap test between the full geometry of the contiguous regions is postponed to the calls to next methods explained below.

When a next method is called, it removes the lowest docId from the heap and executes an overlap test between the contiguous regions of the query and the contiguous regions of the geographic document. If there is no overlap between query and document regions, the document is discarded and the process is repeated for the next document in the heap. If there is overlap, the next method returns true. After the next method returns true, the getDocID and getOverlapStats methods should be ready to return information about the latest geographical document to overlap the query. When the heap is empty, the next method returns false, which means that the end of the cursor has been reached. Note that when the next (docID) method is called, in addition to the logic above, it discards all the documents whose ID is lower than docID.

Conceptually, the overlap operator tests whether the intersection between regions with arbitrary shapes that represent the query and the geographic document is empty or not. If it is empty, the document is discarded and the spatial cursor moves to the next candidate document. If it is not empty, the spatial cursor computes the overlap statistics (to be returned by the getOverlapStats method) and returns the document.

Figure 6:
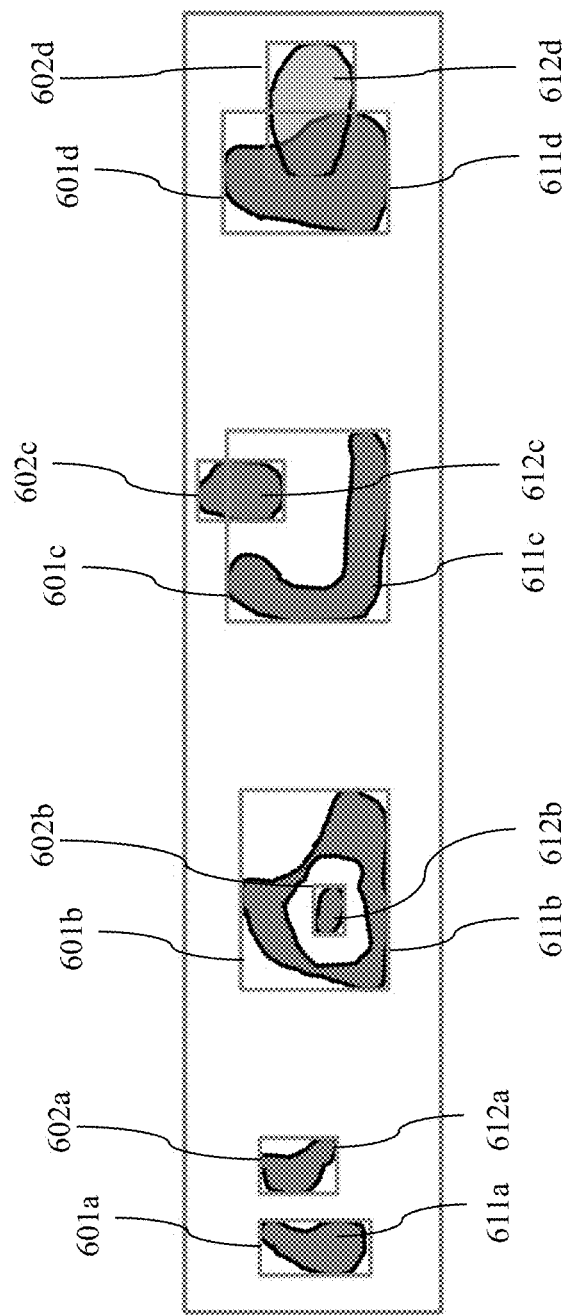
FIG. 6 is a diagram illustrating examples of how pairs of contiguous closed regions and their respective bounding boxes overlap according to certain embodiments.

In one embodiment, the implementation of the overlap operator relies on using the bounding boxes of each contiguous closed region to filter out the vast majority of cases where query and document regions are disjoint. FIG. 6 shows four examples of how pairs of contiguous closed regions and their respective bounding boxes overlap. The bounding boxes 601a and 602a of the regions 611a and 612a, respectively, do not overlap. Therefore, the regions 611 and 612 themselves don't overlap. The bounding boxes 601b and 602b of the regions 611b and 612b, respectively, overlap. So do the bounding boxes 601c and 602c of the regions 611c and 612c, respectively, and the bounding boxes 601d and 602d of the regions 611d and 612d, respectively. Thus a full intersection test between the regions 611b and 612b is required in order to evaluate if the regions overlap or not. The same is true for regions 611c and 612c, and regions 611d and 612d. The full intersection tests would reveal that only regions 611d and 612d in FIG. 6 overlap.

In one embodiment, the full intersection test can be executed using two basic tests: point in polygon and the intersection between two polylines. Exemplary program codes associated with the two basic tests are provided in the following:

```
1 ALGORITHM overlap(region a, region b)
2 BEGIN
3     IF polylinesIntersect(a.externalBoundary, b.externalBoundary)
4         RETURN true
5     aPoint=a.externalBoundary.getPoint( )
6     IF pointInPolygon(aPoint, b.externalBoundary)
7         FOREACH i IN b.internalBoundaries
8             IF pointInPolygon(aPoint, i)
9                 IF polylinesIntersect(i, a.externalBoundary)
10                    RETURN TRUE
11                ELSE
12                    RETURN FALSE
13        RETURN TRUE
14    bPoint=b.externalBoundary.getPoint( )
15    IF NOT pointInPolygon(bPoint, a.externalBoundary)
16        RETURN FALSE
17    FOREACH i IN a.internalBoundaries
18        IF pointInPolygon(bPoint, i)
19            IF polylinesIntersect(i, b.externalBoundary)
20                RETURN TRUE
21            ELSE
22                RETURN FALSE
23    RETURN TRUE
24 END
```

As shown by the program codes above, first, an overlap algorithm tests if the external boundaries of both regions intersect (line 3). If yes, the algorithm returns true. Next, it tests if one point of the external boundary of A is inside the external boundary of B and vice-versa (lines 6 and 15). If both tests fail, then both regions are separate from each other, consequently the algorithm returns false (line 16). Next it tests if a point of the external boundary of region A is inside the internal boundaries of the region B and vice-versa (lines 8 and 18). If yes, the algorithm tests if the external boundary of region B intersects the internal boundary of A, if yes, it returns true (line 10), otherwise it returns false (line 12). The same test is repeated between a point of the external boundary of region B and internal boundaries of region A (lines 17 to 22). Finally, if a point of the external boundary of one region is inside of the external boundary of the other region but it is not inside any of the internal boundaries of that same region, the algorithm returns true (lines 13 and 23).

Figure 7A:
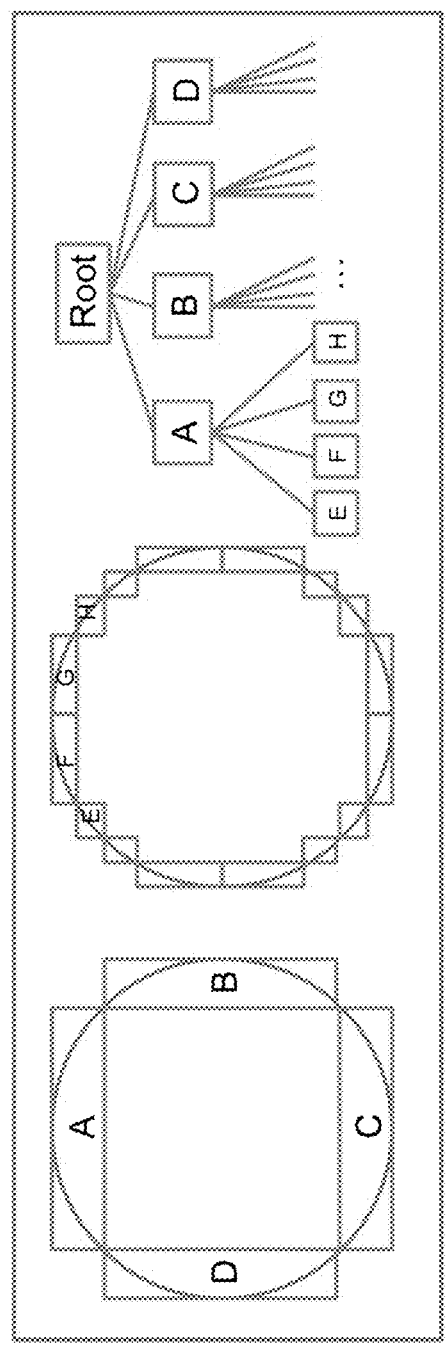
FIG. 7A is a graphical representation of a sequence of points that forms a circle stored in a V-tree according to certain embodiments.

The pointInPolygon and polylinesIntersect algorithms in the overlap algorithm need access to the external and internal boundaries of regions, which are stored in V-trees. FIG. 7A shows a graphical representation of a sequence of points that forms a circle stored in a V-tree according to certain embodiments. The V-tree is a balanced tree that stores the points of the polyline in its leaf nodes. Note that the V-tree preserves the order of the points in the polyline. The polyline is initially split into four main sequences of points, stored under branches A, B, C and D. Branches are recursively subdivided until they can fit into a leaf node.

Figure 7B:
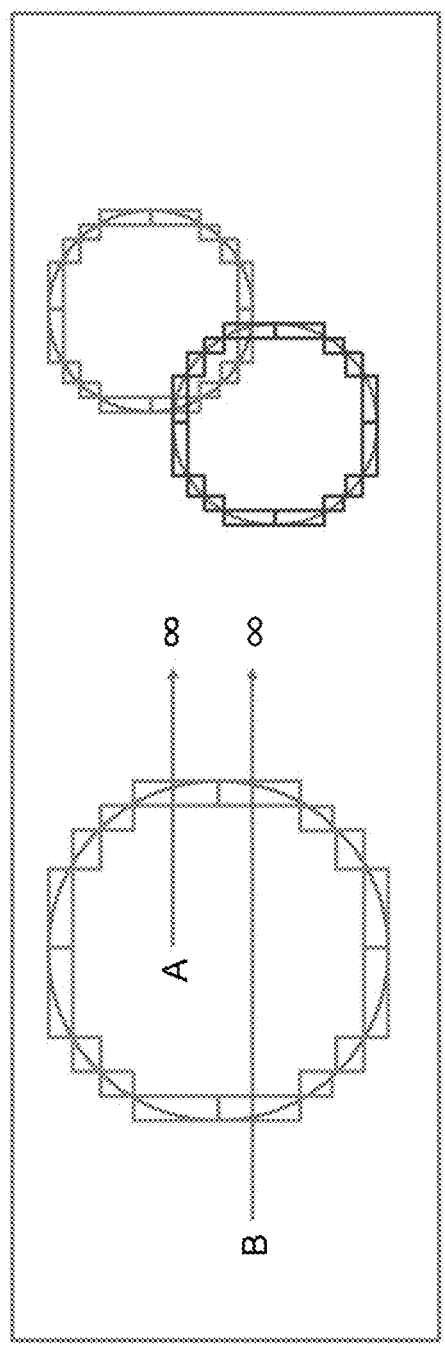
FIG. 7B is a diagram illustrating graphical representations of how pointInPolygon and polylinesIntersect algorithms have their performance enhanced when combined with V-trees according to certain embodiments.

FIG. 7B shows graphical representations of how point in pointInPolygon and polylinesIntersect algorithms have their performance enhanced when combined with V-trees. The traditional point in polygon algorithm extends a line from the point being tested to infinity and counts how many times it crosses the polyline boundary. If the line crosses the polyline boundary an even number of times, then the point is not inside the polygon. If it crosses the polyline boundary an odd number of times, then the point is inside the polygon. Note that in the example the pointInPolygon test for point A touch only one (out of sixteen) leaf nodes of the V-tree in order to conclude that the line crosses the boundary only once. A traditional polylinesIntersect algorithm tests if any two segments, one from each polyline, intersect. The polylinesIntersect algorithm adapted to V-trees quickly discards tests involving large sequences of points from both polylines that are don't intersect. Note that only two pairs of leaf nodes are tested for intersection, out of 256 possible leaf node pairs.

The overlap statistics has well documented algorithms with complexity $O(N*\log(N))$. Where N is the maximum value between the number of points of each polyline and the number of intersections between both polylines.

In one embodiment, the query is executed using zig-zag algorithms, also known as interleaved linear scans, to join the results of the spatial cursor with cursors that traverse the posting lists in the inverted index. For example, the query conjunction below:

---

(ad.targetKeyword == "Sushi Restaurant") AND
(ad.targetDevice=="iPhone") AND
(user.location OVERLAP ad.targetRegion)

--- can be divided into two parts:
(user.location OVERLAP ad.targetRegion)
The documents that satisfy the expression above are selected using the spatial index. The query processor instantiates one spatial cursor to iterate over the documents that satisfy the OVERLAP operator.
(ad.targetKeyword=="Sushi Restaurant") AND (ad.targetDevice=="iPhone")
The documents that satisfy the remainder of the query conjunction are selected using the inverted index. The query processor instantiates two cursors to iterate over the documents that satisfy the clauses above. Each cursor in the inverted index iterates over a posting list containing a list of ids of documents that satisfy one clause. For example, the cursor for the clause (ad.targetDevice=="iPhone") iterates over a posting list that contains the ids of documents whose target device is an iPhone.

Figure 8:
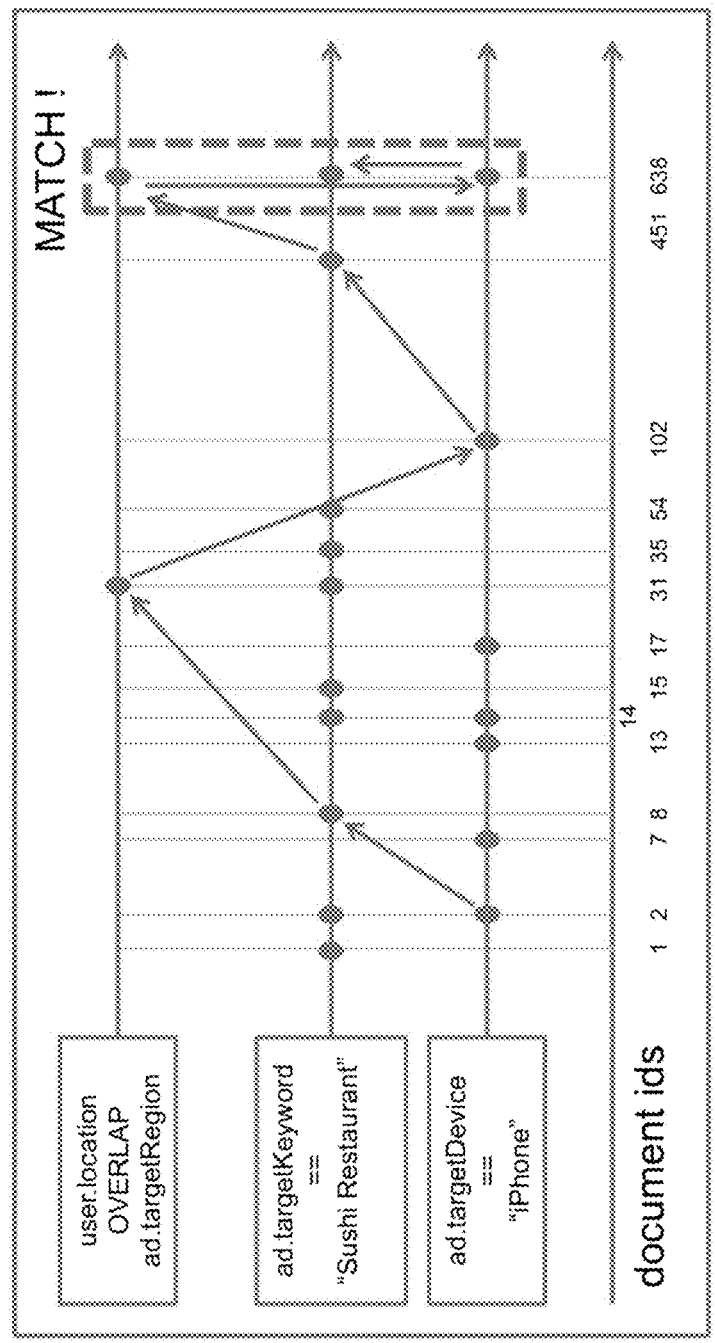
FIG. 8 is a plot showing an example of a Zig-Zag algorithm execution using a query expression according to one embodiment.

FIG. 8 shows an example of a Zig-Zag algorithm execution using the query expression above. The execution starts with a call to the next( )method on the "iPhone" cursor. The cursor returns document 2, the first document that has "iPhone" as target device. Next, it calls the "Sushi Restaurant" cursor with next(2). The "Sushi Restaurant" cursor returns document 8. The last cursor, the spatial cursor OVERLAP, is called with next(8), returning document 31. The Zig-Zag algorithm goes back to the first cursor and repeats the process until all the cursors return the same document. That happens when document 638 is reached. Document 638 is inserted into the list of results and the search continues with the next document, 639. Note that the performance of the Zig-Zag algorithm is dictated by cursor with least number of documents.

When more than one documents are retrieved by the Zig-Zag algorithm, ranking is performed to select one of the document for providing to the mobile user. In certain embodiments, ranking of documents/ads is based on an objective function F that uses three different sets of features:

The probability associated with each of the query contiguous regions (probability of the user being in that region)

The overall matching strength of a query region with a document region purely in terms of spatial features as described in the Zig-Zag algorithm above, and The overall quality strength of a document (CTR, CPM etc.)

F=G(ProbabilisticUserLocation, ZigZagRegionMatches, Documents Quality)

where

ProbabilisticUserLocation=$(r_1, p_{R_1}, r_2, p_{R_2}, \ldots, r_k, p_{R_k})$ where $p_{Rk}$ is the probability of a user being in $r_k$, and ZigZagRegionMatches=$\{m_{r_i, d_j}\}$ where $m_{r_i, dj}$ is the matching strength of region $r_i$ with document $d_j$, and Documents Quality=$(q_{d_1}, q_{d_2}, \ldots, q_{d_n})$ where $q_{d_i}$ is the quality strength of document $d_i$.

In certain embodiments, the spatial features listed below can be used by machine learning models to rank documents that are retrieved by the Zig-Zag algorithm:

Query features:
    Number of contiguous regions of the query
    Total area of all contiguous regions of the document
    Area of the largest region
    Area of the smallest region
    Area of the largest region divided by total area
    Area of the smallest region divided by the total area
    Maximum distance between two contiguous regions
    Minimum distance between two contiguous regions Document features:
    Number of contiguous regions of the document
    Total area of all contiguous regions of the document
    Area of the largest region
    Area of the smallest region
    Area of the largest region divided by total area
    Area of the smallest region divided by total area
    Maximum distance between two contiguous regions
    Minimum distance between two contiguous regions Query-Document features:
  Total area of overlap
  Maximum area of overlap for a single contiguous region
  Minimum area of overlap for a single contiguous region
  Maximum ratio of overlap for a single contiguous region
  Minimum ratio of overlap for a single contiguous region
  Number of overlap regions
  Ratio of overlap on largest query region
  Ratio of overlap on smallest query region
  Ratio of overlap on largest document region
  Ratio of overlap on smallest document region In certain embodiment, one of the following two different approaches to modeling the objective function F can be used:

A model can be learnt using a first approach, which explicitly combines spatial features that help predict the matching strength with user location probability and document quality, or A model can be learnt using a second approach, which computes a matching strength explicitly using spatial features by learning another function, and where the output of this other function is used as a feature along with location probability and document quality.

The problem with the second approach is that it could be difficult to include user feedback of clicks/calls during learning with the documents that are actually presented to the user (the best document by matching strength need not necessarily be presented to the user every time), and hence one could be forced to work with a subset of impressions where the feedback is always available to the document with best matching score. The problem with the first approach is that the number of features to be learnt simultaneously is increased as there are many spatial features, often somewhat contradictory to each other, along with a few features from other two components. In one embodiment, the first approach is used initially since it involves only one model development.

A another issue to address in the model development is the nature of impact of the 3 components. Independently, each of the 3 components of the overall objective function has a direct correlation with the metric. However, it is more difficult to compare two ads where a first document is retrieved with a high value of user region and a low value of matching score, and a second document is retrieved with a low value of user region and a high value of matching score. Since it is not clear whether this relationship is linear or non-linear, a more general approach should be followed, and the objective function can be defined as follows:

$$F = \sum_i w_i * f_i$$

where $w_i$ is the weight associated with a feature $f_i$. The weights are learnt using logistic regression. The features include non-linear variations of the basic features of all 3 components also. For example, probability of user region, $p_{R_k}$ is one feature while $(p_{R_k})^2$, $(p_{R_k})^3$, $(p_{R_k})^4$ etc. are additional features used to capture non-linearity.

An alternative function, which can be simpler to try out, is based on the following assumptions:

The impact of a probability associated with a user is independent of matching and quality strengths; and The matching strength can just be binary depending on whether or not there is an overlap between query region and document (going back to fish analogy, whether or not a fish is within the net of an ad)

With these assumptions, an objective function for ranking could be defined as:

$$F = (p_{R_i})^k * eCPM_i$$

where k is the only parameter to learn (given the probabilities and eCPMs to this model as inputs), and the form of the function helps give different weights to these components.

We claim:

1. A method of retrieving geographical documents performed by one or more computer systems coupled to a packet-based network, comprising:
   generating a probabilistic representation of a location of a mobile device based on a request received from the packet-based network and historical data stored in a data store, the request being associated with the mobile device and including a location indicator and one or more other parameters, the probabilistic representation including multiple contiguously closed geographical regions of arbitrary shapes and probabilities of the mobile device being in respective ones of the multiple contiguously closed geographical regions;
   receiving a query having spatial clauses and at least one other clause, the spatial clauses representing the multiple contiguously closed geographical regions of arbitrary shapes, and the at least one other clause representing at least one of the one or more other parameters;
   retrieving first documents from geographical documents stored in a computer readable medium, the geographical documents each having associated therewith a spatial index and an inverted index, each of the first documents having its associated spatial index matching at least one of the spatial clauses;
   selecting second documents from the first documents, the second documents each having its associated inverted index matching the at least one other clause in the query; and
   selecting a third document from the second documents based at least on the probabilities of the mobile device being in the multiple contiguously closed geographical regions.

2. The method of claim 1 wherein the spatial index associated with each geographical document represents one or more contiguously closed geographical regions of arbitrary shapes.

3. The method of claim 2, wherein each of the one or more contiguously closed geographical regions represented by the spatial index has associated therewith a bounding box, and wherein retrieving first documents comprises:
   computing a bounding box for each of the multiple contiguously closed geographical regions represented by the query; and
   selecting fourth documents from the geographical documents stored in the computer readable medium, each of the fourth documents having associated therewith one or more bounding boxes intersecting one or more of the bounding boxes for the multiple contiguously closed geographical regions represented by the query.

4. The method of claim 3, wherein the first documents is selected from the fourth documents each of the first documents having its associated spatial index representing one or more contiguously closed geographical regions overlapping at least one of the multiple contiguously closed regions represented by the query.

5. The method of claim 4, wherein selecting one of the second documents is further based on features of the one or more contiguously closed geographical regions represented by the spatial index that overlap with any of the multiple contiguously closed regions represented by the query.

6. The method of claim 1, further comprising transmitting the third document to the packet-based network.

7. The method of claim 1, wherein selecting the third documents is further based on a document strength associated with each of the second documents.

8. The method of claim 1, selecting one of the second documents is further based on an overall matching strength of the spatial index associated with each of the first documents matching at least one of the spatial clauses in the query.

9. An apparatus, comprising:
a location engine that receives a request associated with a mobile device and including a location indicator and one or more other parameters, the location engine generating a probabilistic representation of a location of the mobile device based on the request and historical data, the probabilistic representation including multiple contiguously closed geographical regions of arbitrary shapes and probabilities of the mobile device being in respective ones of the multiple contiguously closed geographical regions;
one or more data stores storing therein the historical data and geographical documents each having associated therewith a spatial index and an inverted index, the spatial index associated with each geographical document representing one or more contiguously closed geographical regions of arbitrary shapes; and
a geographical document retrieval engine configured to retrieve from the one or more data store a first geographical document selected based at least on: the multiple contiguously closed geographical regions of arbitrary shapes including at least one first geographical region that overlaps with at least one geographical region represented by the spatial index associated with the first geographical document, and the probability of the mobile device being in the at least one first geographical region.

10. The apparatus of claim 9, wherein the first geographical document is further selected based on the one or more other parameters including at least one parameter matching the spatial index of the first geographical document.

11. The apparatus of claim 10, wherein each of the one or more contiguously closed geographical regions represented by the spatial index has associated therewith a bounding box, and wherein the geographical document retrieval engine selects the geographical document by:
computing a bounding box for each of the multiple contiguously closed geographical regions in the probabilistic representation; and
selecting second documents each having one or more bounding boxes intersecting one or more bounding boxes for the one or more contiguously closed geographical regions represented by the query.

12. The apparatus of claim 11, wherein the first documents is selected from the second documents.

13. The apparatus of claim 9, wherein the geographical document retrieval engine is further configured to transmit the first document to a packet-based network.

14. The apparatus of claim 13, wherein at least one of the multiple contiguously closed geographical regions in the probabilistic representation includes an outer boundary and an inner boundary.

15. The apparatus of claim 13, wherein the geographical document retrieval engine is further configured to determine a fraction of an area of each of the multiple contiguously closed regions in the probabilistic representation that overlaps with at least one of the geographical regions associated with the first document and to select the first document based at least on the fraction.

16. A method of retrieving a geographical document in response to a request for document received from a packet-based network, the request being associated with a mobile device communicating with the packet-based network and including a location indicator indicating a location of the mobile device and one or more other parameters, comprising:
generating a probabilistic representation of the location of the mobile device based on the request for document, the probabilistic representation including multiple contiguously closed geographical regions of arbitrary shapes and probabilities of the mobile device being in respective ones of the multiple contiguously closed geographical regions;
retrieving first documents from geographical documents stored in a computer readable medium, the first documents each having at least one associated geographical region overlapping at least one of the multiple contiguously closed geographical regions in the probabilistic representation and at least one associated non-spatial feature matching one of the one or more other parameters;
selecting a second document from the first documents based at least on the probabilities of the mobile device being in the multiple contiguously closed geographical regions.

17. The method of claim 16 wherein at least one of the multiple contiguously closed geographical regions in the probabilistic representation includes an outer boundary and an inner boundary.

18. The method of claim 16, wherein each of the geographical documents stored in the computer readable medium has associated therewith a bounding box, and wherein retrieving first documents comprises:
computing a bounding box for each of the multiple contiguously closed geographical regions in the probabilistic representation;
selecting third documents from the geographical documents stored in the computer readable medium, each of the third documents having associated therewith one or more bounding boxes intersecting one or more of the bounding boxes for the multiple contiguously closed geographical regions in the probabilistic representation; and
retrieving the first documents from the third documents.

19. The method of claim 17, further comprising determining a fraction of an area of each of the multiple contiguously closed regions in the probabilistic representation that overlaps with at least one of the geographical regions associated with the first documents, and selecting the second document from the first documents based at least on the fraction.

20. The method of claim 16, further comprising transmitting the second document to the packet-based network.

* * * * *